(12) United States Patent
Xiong et al.

(10) Patent No.: US 11,115,594 B2
(45) Date of Patent: Sep. 7, 2021

(54) SHUTTER SPEED ADJUSTING METHOD AND APPARATUS, AND ROBOT USING THE SAME

(71) Applicant: UBTECH Robotics Corp, Shenzhen (CN)

(72) Inventors: Youjun Xiong, Shenzhen (CN); Xiangnan Gu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 465 days.

(21) Appl. No.: 16/195,871

(22) Filed: Nov. 20, 2018

(65) Prior Publication Data

US 2019/0199899 A1 Jun. 27, 2019

(30) Foreign Application Priority Data

Dec. 26, 2017 (CN) .......................... 201711435474.9

(51) Int. Cl.
*H04N 5/232* (2006.01)
*B25J 9/16* (2006.01)
*B25J 19/02* (2006.01)
*H04N 5/235* (2006.01)

(52) U.S. Cl.
CPC .......... *H04N 5/2329* (2013.01); *B25J 9/1664* (2013.01); *B25J 9/1697* (2013.01); *B25J 19/023* (2013.01); *H04N 5/2353* (2013.01); *H04N 5/23258* (2013.01); *H04N 5/23267* (2013.01)

(58) Field of Classification Search
CPC .............. H04N 5/2329; H04N 5/2353; H04N 5/23258; H04N 5/23267; H04N 5/232; H04N 5/23212; B25J 9/1664; B25J 19/023; B25J 9/1697
See application file for complete search history.

(56) References Cited

FOREIGN PATENT DOCUMENTS

| CN | 106657805 A | 5/2017 |
|---|---|---|
| CN | 107181918 A | 9/2017 |

OTHER PUBLICATIONS

English Translation of CN 106657805 (Year: 2017).*

* cited by examiner

*Primary Examiner* — Twyler L Haskins
*Assistant Examiner* — Angel L Garces-Rivera

(57) ABSTRACT

The present disclosure provides a shutter speed adjusting method and apparatus or a robot with a photographing device, and a robot using the same. The method includes: obtaining a motion speed of the robot; obtaining an included angle between a motion direction of the robot and a shooting direction of the photographing device; obtaining a distance between the robot and a photographed object; and adjusting a shutter speed of the photographing device based on the motion speed, the included angle, and the distance. Through the present disclosure, the problem of blurred picture caused by the movement of the robot itself can be avoided, thereby improving the photographing quality.

18 Claims, 4 Drawing Sheets

SHUTTER SPEED ADJUSTING METHOD AND APPARATUS, AND ROBOT USING THE SAME

CROSS REFERENCE TO RELATED APPLICATIONS n

This application claims priority to Chinese Patent Application No. 201711435474.9, filed Dec. 26, 2017, which is hereby incorporated by reference herein as if set forth in its entirety.

BACKGROUND

1. Technical Field

The present disclosure relates to robot technology, and particularly to a shutter speed adjusting method and apparatus tor a robot with a photographing device, and a robot using the same.

2. Description of Related Art

The shutter speed is in important parameter when shooting with a digital camera. The shutter speed has to be set differently for different shooting environments. Especially when shooting a moving object, if the shutter speed is set too slow, the shot picture is easily to be blurred; if the shutter speed is set too fast, it may cause the shot picture to have jumps.

When a robot is used to shoot a picture, since a speed may be generated during the motion of the robot itself and the speed will change, the shot picture may be blurred.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some example of the present disclosure. For those skilled in the art, the drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to he understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the presort disclosure refers to any combination of one or more of the associated listed items and all possible combinations, and includes such combinations.

As used in the description and the appended claims, the term "if" may he interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" "in response to detecting [the described condition or event]".

For the purpose of describing the technical solutions of the present disclosure, the following describes through specific embodiments.

EMBODIMENT 1

Figure 1:
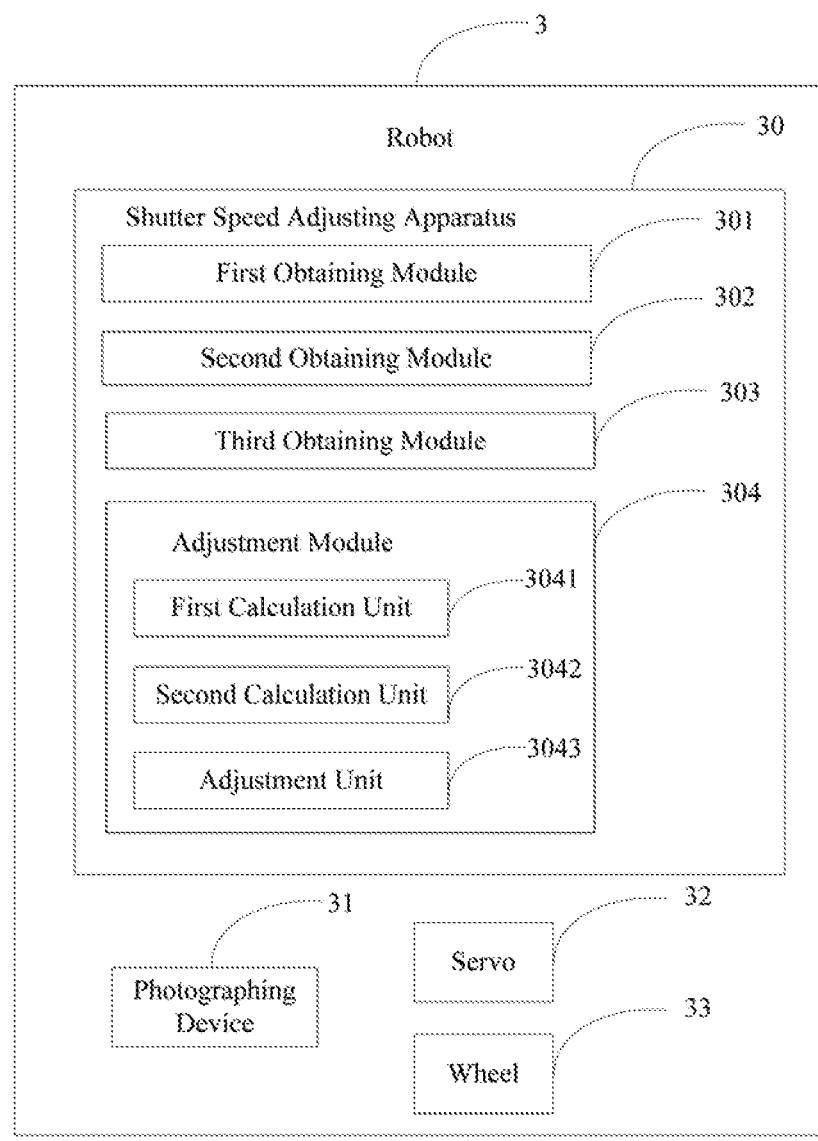
FIG. 1 is a schematic block diagram of the structure of a shutter speed adjusting apparatus according to a first embodiment of the present disclosure.

FIG. 1 is a schematic block diagram of the structure of a shutter speed adjusting apparatus according to a first embodiment of the present disclosure. For convenience of explanation, only parts related to this embodiment are shown. As shown FIG. 1, a shutter speed adjusting apparatus 30 is provided.

The shutter speed adjusting apparatus 30 may be a software unit, a hardware unit or a combination of software and hardware units which is embodied in a robot 3 or a photographing device (e.g., a camera, a webcam), or may be integrated into the robot 3 or the photographing device in a form of an independent device. The robot 3 includes a photographing device 31, servo(s) 32, and wheel(s) 33.

The shutter speed adjusting apparatus 30 includes a first obtaining module 301, a second obtaining module 302, a third obtaining module 303, an adjustment module 304.

The first obtaining module 301 is configured to obtain a motion speed of the robot 3;

The second obtaining module 302 is configured to obtain an included angle between a motion direction of the robot 3 and a shooting direction of the photographing device 31;

The third obtaining module 303 is configured to obtain a distance between the robot 3 and a photographed object; and The adjustment module 304 is configured to adjust a shutter speed of the photographing device 31 based on the motion speed, the included angle, and the distance.

Each of the above-mentioned modules may be implemented in the form of hardware (e.g., a circuit), software (e.g., a program), or a combination thereof (e.g., a circuit with a single chip microcomputer). The shutter speed adjusting apparatus 30 may include one or more processors, a storage (e.g., a memory), and one or more computer programs stored in the storage and executed by the processor, where the one or more computer programs include the above-mentioned modules.

Optimally, in the shutter speed adjusting apparatus 30, the first obtaining module 301 may be configured to calculate the motion speed of the robot based on a rotational speed of the servo 32 through the following formula:

$$v = R \times \omega;$$

where, v indicates the motion speed of the robot, ω indicates the angular speed of the servo 32 of the robot, and R indicates the radius of a wheel of the robot.

Optionally, the second obtaining module 302, may be configured to obtain a rotational angle of the photographing device 31 and calculate the included angle between the motion direction of the robot and the photographing direction of the photographing device 31 based on the rotational angle of the photographing deice 31 through the following formula:

$$w = |w1 - 90°|;$$

where, w indicates the included angle and w1 indicates the rotational angle of the photographing device 31.

Optionally, in the shutter speed adjusting apparatus 30, the third obtaining module 303 may be configured to obtain the distance value between the robot and the photographed object through a laser sensor or a radar sensor.

Optionally, in the shutter speed adjusting apparatus 30, the adjustment module 304 ma include:

a first calculation unit 3041 configured to calculate a first shutter speed based on the motion speed of the robot and the distance between the robot and the photographed object through the following formula:

$$v1 = \frac{d}{v \cdot u};$$

where, v1 indicates the first shutter speed, v indicates the motion speed of the robot, d indicates the distance between the robot and the photographed object, and u indicates a lens focal length of the photographing device 31;

a second calculation unit 3042 configured to calculate a second shutter speed based on the first shutter speed and the included angle between the motion direction of the robot and the shooting direction of the photographing device 31 through the following formula:

$$v2 = v1 \cdot K;$$

where, v2 indicates the second shutter speed, v1 indicates the first shutter speed, and K indicates a scale factor corresponding to the included angle; and an adjustment unit 3043 configured to adjust the shutter speed of the photographing device 31 based on the second shutter speed.

The faster the robot moves, the faster the shutter speed should be. For example, when photographing an object falling from a height, it takes about 1/1000 second of the shutter speed; and when photographing the normal movement of a person, it takes about 1/60 second of the shutter speed; when photographing the scene outside a car from the car, the shutter speed for photographing the side view should be faster than the shutter speed for photographing the front view; the closer the robot is to the photographed object, the faster the shutter speed should be. Each of the above-mentioned units mar be implemented in the form of hardware (e.g., a circuit), software e.g., a program), or a combination thereof (e.g., a circuit with a single chip microcomputer).

In this embodiment, the shutter speed of the photographing device can be dynamically adjusted based on the motion speed of the robot, the included angle between the motion direction of the robot and the shooting direction of the photographing device, and the distance between the robot and the photographed object, so as to effectively avoid the problem of blurred picture caused by the movement or the angle change of the robot itself; thereby improving the photographing quality, which has better usability and practicability.

EMBODIMENT 2

Figure 2:
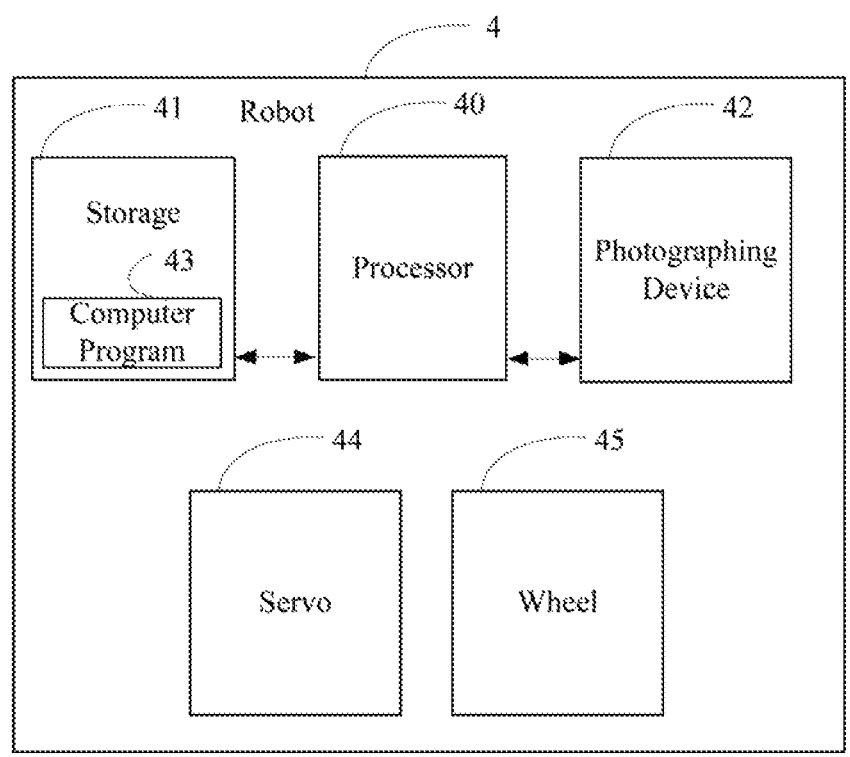
FIG. 2 is a schematic block diagram of the structure of a robot according to a second embodiment of the present disclosure.
Figure 3:
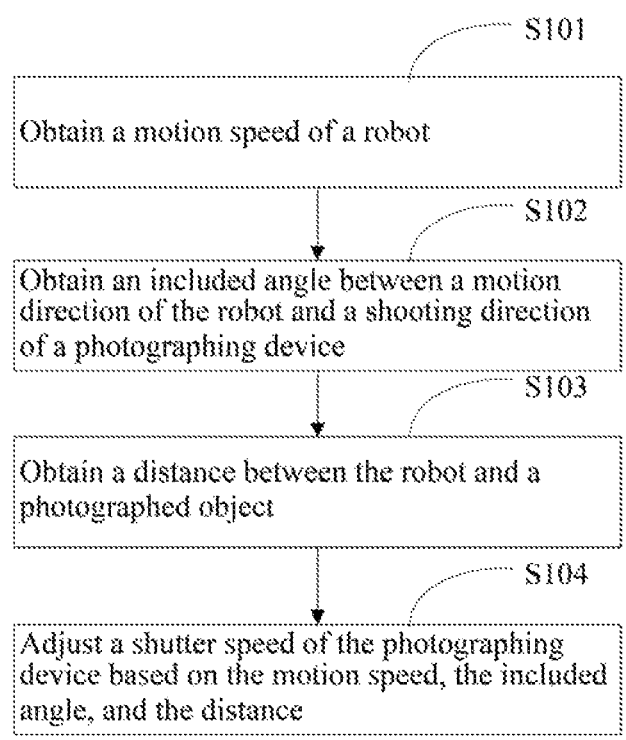
FIG. 3 is a chart of a shutter speed adjusting method according to a third embodiment of the present disclosure.

FIG. 2 is a schematic block diagram of the structure of a robot according to a second embodiment of the present disclosure. As shown in FIG. 2, in Embodiment 2, a robot 4 includes a processor 40, a storage 41 (e.g., a memory), a photographing device 42, a computer program 43 stored in the storage 41 and executable on the processor 40, for example, a lava program, servo(s) 44, and wheel(s) 45. When the processor 40 executes the computer program 43, the steps in the method embodiments of the above-mentioned shutter speed adjusting method such as steps S101-S104 shown in FIG. 3 are implemented, or the functions of the modules/units in the device embodiments of the above-mentioned shutter speed adjusting apparatus such as the modules 301-304 shown in FIG. 1 are implemented.

Exemplarily, the computer program 43 can be divided into one or more modules/units, where the one or more modules/units are stored in the storage 41 and executed by the processor 40 so as to implement the present disclosure. The one or more modules/units may be a series of computer program instruction segments capable of performing a particular function, where the instruction segments for describing the execution process of the computer program 43 in the robot 4. For example, the computer program 43 can be divided into a first obtaining module 301, a second obtaining module 302, a third obtaining module 303, and an adjustment module 304.

The robot 4 may include, but is not limited to, the processor 40, the storage 41, and the photographing device 42. It can be understood by those skilled in the art that FIG. 2 is merely an example of the robot 4 and does not constitute a limitation on the robot 4, and may include more or fewer components than those shown in the figure, or a combination of some components or different components, for example, the robot 4 may also include an input/output device, a network access device, a bus, and the like.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the robot 4, for example, a hard disk or a memory of the robot 4. The storage 41 may also be an external storage device of the robot 4, for example, a plug-in hard disk, a smart media card (SMC), a secure digital (SD) card, flash card, and the like, which is equipped on the robot 4. Furthermore, the storage 41 may further include both an internal storage unit and an external storage device, of the robot 4. The storage 41 is configured to store the computer program and other programs and data required by the robot 4. The storage 41 may also be used to temporarily store data that has been or will be output.

EMBODIMENT 3

FIG. 3 is a flow chart of a shutter speed adjusting method according to a third embodiment of the present disclosure. The shutter speed adjusting method may be applied to a robot having a photographing device such as a camera. In this embodiment, the method is a computer-implemented method executable for a processor, which may be implemented through a shutter speed adjusting apparatus for a robot shown in FIG. 1. As shown in FIG. 3, the method includes the following steps.

S101: obtaining a motion speed of the robot.

Specifically, the motion speed of the robot can be calculated based on a rotational speed of a servo of the robot through the following formula:

$$v = R \times \omega;$$

where, v indicates the motion speed (linear speed) of the robot, ω indicates the angular speed of the servo of the robot, and R indicates the radius of a wheel of the robot.

In this embodiment, the robot can he moved through two or more wheels that have a same orientation. When the robot moves linearly (regardless of friction and wheel slip), if the rotational speed of each wheel is equivalent, and the radius of each wheel is equivalent, it can be seen through the above-mentioned formula that the linear speed of each wheel is equivalent. The linear speed of the wheel at the moment when the wheel touches the ground is adopted as the motion speed. According to a microcosmic view, this linear speed is equal to the speed of a center point of the wheel. Since the linear speed of each wheel is equivalent, the linear speed of the wheel is equal to the speed of the center of the quality of the robot, that is, the motion speed of the robot.

S102: obtaining an included angle between a motion direction of the robot and a shooting direction of the photographing device.

In this embodiment, the motion direction of the robot and the shooting direction of the photographing device are initially the same, that is, the included angle between the motion direction of the robot and the shooting direction of the photographing device is initially 0°.

Specifically, step S102 may include:

obtaining a rotational angle of the photographing device;

calculating the included angle between the motion direction of the robot and the photographing direction of the photographing device based on the rotational angle of the photographing device through the following formulas:

$$w = |w1 - 90°|, \text{ if } w1 \leq 180;$$

$$w = |360 - w1 - 90|, \text{ if } 180 < w1 < 360;$$

where, w indicates the included angle and w1 indicates the rotational angle of the photographing device.

It should be noted that, in general, the initial direction of the photographing device is the same as the motion direction of the robot. In this case, the shooting direction of the photographing device is 90° with respect to the motion direction of the robot, and the above-mentioned formula w=|w1-90°| can be adopted to obtain the included angle w between the motion direction of the robot and the photo-graphing direction of the photographing device (the photographing direction of the photographing device corresponds to the optical axis of the lens of the photographing device) directly with the unit of degrees.

S103: obtaining a distance between the robot and a photographed object.

Exemplarily, the distance value between the robot and the photographed object (i.e., the object to he photographed) can be obtained through a laser sensor or a radar sensor.

S104: adjusting a shutter speed of the photographing device based on the motion speed, the included angle, and the distance.

Optionally, before step S104, it may be determined whether the motion speed, the included angle, and the distance are valid. For example, when the minimum focusing distance of the photographing device is 0.5 meters, if the distance between the robot and the photographed object is less than 0.5 meters, the photographing device cannot focus correctly, hence a clear picture cannot be obtained no matter the shutter speed is adjusted. Therefore, a value range can be set for each of the motion speed, the included angle, and the distance, and the motion speed, the included angle, and the distance are determined as valid if the motion speed, the included angle, and the distance are all within their corresponding value range, and then the shutter speed of the photographing device is adjusted based on the motion speed, the included angle, and the distance.

In this embodiment, the shutter speed of the photographing device can be dynamically adjusted based on the motion speed of the robot, the included angle between the motion direction of the robot and the shooting direction of the photographing device, and the distance between the robot and the photographed object, so as to effectively avoid the problem of blurred picture caused by the movement or the angle change of the robot itself, thereby improving the photographing quality.

Figure 4:
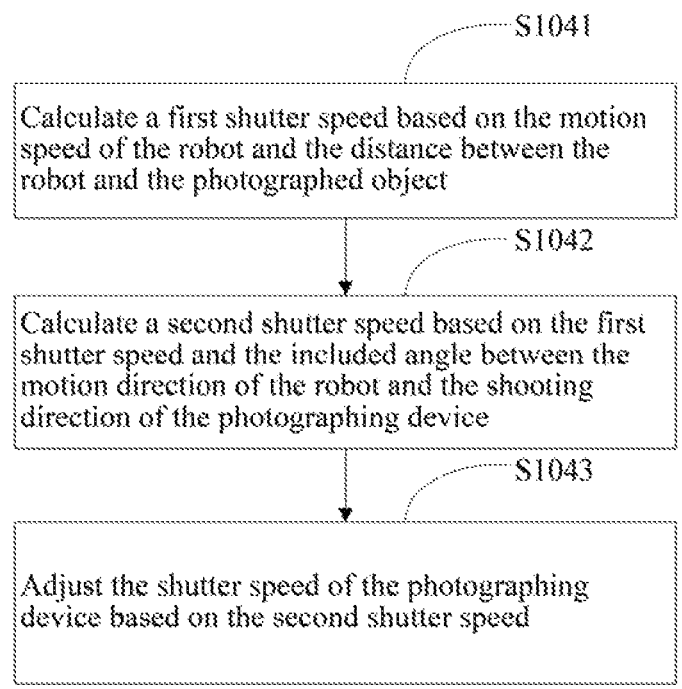
FIG. 4 is a flow chart of step S104 of the shutter speed adjusting method according to the third embodiment of the present disclosure.

FIG. 4 is a flow chart of step S104 of the shutter speed adjusting method according to the third embodiment of the present disclosure. As shown in FIG. 4, the method includes the following steps.

S1041: calculating a first shutter speed based on the motion speed of the robot and the distance between the robot and the photographed object.

In S1041, the formula for calculating the first shutter speed is:

$$v1 = \frac{d}{v \cdot u}$$

where, v1 indicates the first shutter speed, v indicates the motion speed of the robot (e.g., yard/hour), d indicates the distance between the robot and the photographed object (e.g., inch), and u indicates a lens focal length of the photographing device (e.g., inch). The relationship between the shutter speed, the distance between the robot and the photographed object, as well as the motion speed of the robot is basically meeting the above-mentioned formula. If the included angle between the motion direction of the robot and the photographing direction of the photographing: device is 90° (10≤w 0), ⅓ of the shutter speed is used; if the included angle between the motion direction of the robot and the photographing direction of the photographing device is 45° (10<w45), ⅔ of the shutter speed is used.

S1042: calculating a second shutter speed based on the first shutter speed and the included angle between the motion direction of the robot and the shooting direction of the photographing device.

In S1042, the formula for calculating the second shutter speed is:

$$v2 = v1 \cdot K;$$

where, v2 indicates the second shutter speed, v1 indicates the first shutter speed, and K indicates a scale factor corresponding to the included angle; and It should be noted that, the relationship between the included angle between the motion direction of the robot and the photographing direction a the photographing device and the proportional coefficient K may be linear, for example, if the included angle between the motion direction of the robot and the photographing direction of the photographing device is 60°<w≤90°, K is set as ⅓; if the included angle between the motion direction of the robot and the photographing direction of the photographing device is 60°≤w30°, K is set as ⅔; if the included angle between the motion direction of the robot and the photographing direction of the photographing device is 0°<w≤30°, K is set as 1.

S1043: adjusting the shutter speed of the photographing device based on the second shutter speed.

In order to improve the shooting quality, the relationship be the shutter speed as well as the motion speed of the robot, the included angle between the motion direction of the robot and the shooting direction of the photographing device, and the distance between the robot and the photographed object can be understood as: the faster the robot moves, the faster the shutter speed should be; the similar the included angle between the motion direction of the robot and the shooting direction of the photographing device is to a right angle, the faster the shutter speed should be; the closer the robot is to the photographed object, the faster the shutter speed should be.

Exemplarily, after obtaining the first shutter speed based on the motion speed of the robot and the distance between the robot and the photographed object, if the included angle between the motion direction of the robot and the shooting direction of the photographing device is close to 90°, the shutter speed of the photographing device can be increased in this case, that is, the value of K is reduced, so as to avoid the condition that the shutter speed is too slow and the picture is blurred.

In this embodiment, the shutter speed of the photographing device is adjusted by transmitting an instruction including the second shutter speed to the photographing device, thereby adjusting the shutter speed of the photographing device to the second shutter speed.

In this embodiment, the first shutter speed is first calculated based on the motion speed of the robot and the distance between the robot and the photographed object, and then the second shutter speed is calculated based on the included angle between the motion direction of the robot and the shooting direction of the photographing device and the first shutter speed, and finally a shutter speed parameter of the photographing device is adjusted based on the second shutter speed, so as to realize the real-time and dynamic adjustment of the shutter speed of the photographing device during the movement of the robot, thereby effectively improving the shooting quality, which has better usability and practicability.

It should be understood that, the sequence of the serial number of the steps in the above-mentioned embodiments does not mean the execution order while the execution order of each process should be determined by its function and internal logic, which should not be taken as any limitation to the implementation process of the embodiments.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may he integrated in one processing unit, or each unit may exist alone physically, or two or more anus may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends On the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed device (apparatus), and, method may be implemented in other manners. For example, the above-mentioned device embodiment is merely exemplary. For example, the division of modules/units is merely a logical functional division, and other division manner may be used in actual implementations, that is, multiple units or components may be combined or be integrated into another system, or some of the features as be ignored or not performed. In another aspect, the coupling such as direct coupling and communication connection which is showing or discussed can be implemented through some interfaces, and the indirect coupling and the communication connection between devices or units can be electrical, mechanical, or otherwise.

The units described as separate components may or may not be physically separated. The components represented as units may or may not be physical units, that is, may be located in one place or be distributed to multiple network units. Some or all of the units may be selected according ifs actual needs to achieve the objectives of this embodiment.

In addition, each functional unit in each of the embodiments of the present disclosure may be integrated into one processing unit, or each unit may exist alone physically, or two or more wars may be integrated m one unit. The above-mentioned integrated unit may he implemented in the form of hardware or in the form of software functional unit.

When the integrated module/unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also he implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments ma still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented shutter speed adjusting method for a robot with a photographing device, comprising executing on a processor the steps of:
   obtaining a motion speed of the robot;
   obtaining an included angle between a motion direction of the robot and a shooting direction of the photographing device;
   obtaining a distance between the robot and a photographed object; and
   adjusting a shutter speed of the photographing device based on the motion speed, the included angle, and the distance;
   wherein the step of obtaining the motion speed of the robot comprises:
   calculating the motion speed of the robot based on a rotational speed of a servo of the robot through the following formula:

$v = R \times \omega$, where, v indicates the motion speed of the robot, $\omega$ indicates the angular speed of the servo of the robot, and R indicates the radius of a wheel of the robot.

2. The method of claim 1, wherein, the step of obtaining the included angle between the motion direction of the robot and the shooting direction of the photographing device comprises:
   obtaining a rotational angle of the photographing device;
   calculating the included angle between the motion direction of the robot and the photographing direction of the photographing device based on the rotational angle of the photographing device through the following formula:

$w = |1 - 90°|$;

where, w indicates the included angle and w1 indicates the rotational angle of the photographing device.

3. The method of claim 1, wherein the step of obtaining the distance between the robot and the photographed object comprises:
   obtaining the distance between the robot and the photographed object through a sensor.

4. The method of claim 1, wherein the step of adjusting the shutter speed of the photographing device based on the motion speed, the included angle, and the distance comprises:
   calculating a first shutter speed based on the motion speed of the robot and the distance between the robot and the photographed object through the following formula:

$$v1 = \frac{d}{v \cdot u};$$

where, v1 indicates the first shutter speed, v indicates the motion speed of the robot, d indicates the distance between the robot and the photographed object, and u indicates a lens focal length of the photographing device;
   calculating a second shutter speed based on the first shutter speed and the included angle between the motion direction of the robot and the shooting direction of the photographing device through the following formula:

$v2 = v1 \cdot K$;

where, v2 indicates the second shutter speed, v1 indicates the first shutter speed, and K indicates a scale factor corresponding to the included angle; and
   adjusting the shutter speed of the photographing device based on the second shutter speed.

5. The method of claim 3, wherein the step of obtaining the distance between the robot and the photographed object through the sensor, comprises:
   obtaining the distance between the robot and the photographed object through through a laser sensor or a radar sensor.

6. The method of claim 1, the step of adjusting the shutter speed of the photographing device based on the motion speed, the included angle, and the distance, comprises:
   determining whether the motion speed, the included angle, and the distance are all within their corresponding value range; and
   adjusting the shutter speed of the photographing device based on the motion speed, the included angle, and the distance, when the distance are all within their corresponding value range.

7. A shutter speed adjusting apparatus for a robot with a photographing device, comprising:

a first obtaining module configured to obtain a motion speed of the robot;

a second obtaining module configured to obtain an included angle between a motion direction of the robot and a shooting direction of the photographing device;

a third obtaining module configured to obtain a distance between the robot and a photographed object; and an adjustment module configured to adjust a shutter speed of the photographing device based on the motion speed, the included angle, and the distance;

wherein the first obtaining module is configured to: calculating the motion speed of the robot based on a rotational speed of a servo of the robot through the following formula:

$$v = R \times \omega;$$

where, v indicates the motion speed of the robot, ω indicates the angular speed of the servo of the robot, and R indicates the radius of a wheel of the robot.

8. The apparatus of claim 7, wherein the second obtaining module is configured to:

obtaining a rotational angle of the photographing device;

calculating the included angle between the motion direction of the robot and the photographing direction of the photographing device based on the rotational angle of the photographing device through the following formula:

$$w = |w1 - 90°|;$$

where, w indicates the included angle and w1 indicates the rotational angle of the photographing device.

9. The apparatus of claim 7, the third obtaining module is configured to obtain the distance between the robot and the photographed object through a sensor.

10. The apparatus of claim 7, wherein the adjustment module comprises:

a first calculation unit configured to calculate a first shutter speed based on the motion speed of the robot and the distance between the robot and the photographed object through the following formula:

$$v1 = \frac{d}{v \cdot u};$$

where, v1 indicates the first: shutter speed, v indicates the motion speed of the robot, d indicates the distance between the robot and the photographed object, and u indicates a lens focal length of the photographing device;

a second calculation unit configured to calculate a second shutter speed based on the first shutter speed and the included angle between the motion direction of the robot and the shooting direction of the photographing device through the following formula:

$$v2 = v1 \cdot K;$$

where, v2 indicates the second, shutter speed, v1 indicates the first shutter speed, and K indicates a scale factor corresponding to the included angle; and an adjustment unit configured to adjust the shutter speed of the photographing device based on the second shutter speed.

11. The apparatus of claim 9, wherein the third obtaining module is further configured to obtain the distance between the robot and the photographed object through through a laser sensor or a radar sensor.

12. The apparatus of claim 7, wherein the adjustment module is further configured to determine whether the motion speed, the included angle, and the distance are all within their corresponding value range, and adjust the shutter speed of the photographing device based on the motion speed, the included angle, and the distance, when the distance are all within their corresponding value range.

13. A robot comprising:

a photographing device;

a memory;

one or more processors; and one or more computer programs stored in the memory and executable on the one or more processors, wherein the one or more computer programs comprise:

instructions for obtaining a motion speed of the robot;

instructions for obtaining an included angle between a motion direction of the robot and, a shooting direction of the photographing device;

instructions to obtaining a distance between the robot and a photographed object; and instructions for obtaining adjusting a shutter speed of the photographing device based on the motion speed, the included angle, and the distance;

wherein the instructions for obtaining the motion speed of the robot comprise: instructions for calculating the motion speed of the robot based on a rotational speed of a servo of the robot through the following formula:

$$v = R \times \omega,$$

where, v indicates the motion speed of the robot, ω indicates the angular speed of the servo of the robot, and R indicates the radius of a wheel of the robot.

14. The robot of claim 13, wherein the instructions for obtaining the included angle between the motion direction of the robot and the shooting direction of the photographing device comprise:

instructions for obtaining a rotational angle of the photographing device;

instructions the calculating the included angle between the motion direction of the robot and the photographing direction of the photographing device based on the rotational angle of the photographing device through the following formula:

$$w = |w1 - 90°|;$$

where, w indicates the included angle and w1 indicates the rotational angle of the photographing device.

15. The robot of claim 13, wherein the instructions for obtaining the distance between the robot and the photographed object comprise: instructions for obtaining the distance between the robot and the photographed object through a sensor.

16. The robot of claim 13, wherein the instructions for obtaining adjusting the shutter speed of the photographing device based on the motion speed, the included angle, and the distance comprise:

instructions for calculating a first shutter speed based on the motion speed of the robot and the distance between the robot and the photographed object through the following formula:

$$v1 = \frac{d}{v \cdot u};$$

where, v1 indicates the first shutter speed, v indicates the motion speed of the robot, d indicates the distance between the robot and the photographed object, and u indicates a lens focal length of the photographing device;

instructions for calculating a second shutter speed based on the first shutter speed and the included angle between the motion direction of the robot and the shooting direction of the photographing device through the following formula:

$$v2 = v1 \cdot K;$$

where, v2 indicates the second shutter speed, v1 indicates the first shutter speed, and K indicates a scale factor corresponding to the included angle; and instructions for adjusting the shutter speed of the photographing device based on the second shutter speed.

17. The robot of claim 15, wherein the instructions for obtaining the distance between the robot and the photographed object through the sensor comprise:

instructions for obtaining the distance between the robot and the, photographed object through through a laser sensor or a radar sensor.

18. The robot of claim 13 wherein the instructions for adjusting the shutter speed of the photographing device based on the motion speed, the included angle, and the distance, comprises:

instructions for determining whether the motion speed, the included angle, and the distance are all within their corresponding value range; and instructions for adjusting the shutter speed of the photographing device based on the motion speed, the included angle, and the distance, when the distance are all within their corresponding value range.

* * * * *